Reissued July 14, 1953 Re. 23,685

UNITED STATES PATENT OFFICE 23,685

ALLOY STEEL

William Charles Clarke, Jr., Dundalk, Md., assignor to Armco Steel Corporation, a corporation of Ohio No Drawing. Original No. 2,528,637, dated November 7, 1950, Serial No. 768,718, August 14, 1947. Application for reissue February 7, 1951, Serial No. 209,910

5 Claims. (Cl. 148—31)

Matter enclosed in heavy brackets [ ] appears in the original patent but forms no part of this reissue specification; matter printed in italics indicates the additions made by reissue.

The present application is a continuation-in-part of my copending application, Serial No. 705,245, filed October 23, 1946, *now Patent No. 2,528,497*, and the invention relates to high temperature stainless steel products and articles.

Among the objects of my invention is the provision of strong, tough and durable high temperature stainless steel articles which are resistant to stress-rupture and creep under load at the high temperatures encountered during use, and which are capable of resisting the development of heat scale and attack by hot corrosive matter.

Other objects in part will be obvious and in part pointed out hereinafter.

The invention accordingly consists in the combination of elements, features of composition, and in the several steps and the relation of each of the same to one or more of the others as described herein, and the scope of the application of which is indicated in the following claims.

As conducive to a clearer understanding of certain features of my invention, it may be noted at this point that stainless steel by general definition contains about 10% to 35% chromium, with or without nickel and with or without additions of manganese, silicon, cobalt, copper, molybdenum, tungsten, vanadium, columbium, titanium, aluminum, zirconium and the like, for special purposes, and the remainder substantially all iron. These steels include anywhere from about 0.01% up to about 0.25% carbon, and more of this element where the steels are of the high carbon varieties.

There are ever increasing demands for high temperature articles as for achieving functions at temperatures ranging from about 1000° F. to 1700° F. or higher. These demands sometimes associate the use of the articles with hot corrosive gases, liquids or solids which add to the severity of the conditions to be withstood.

A number of the articles now available in the prior art, for use at high temperatures, therefore, suffer severe injury at the surface, this by active attack by corrosive chemicals. An example of this is had where the articles are in the form of parts for high temperature chemical equipment. In many instances, too, the intense heat leads to the development of large amounts of oxide or heat scale on the article surfaces. Also, certain of the articles are susceptible to creep or rupture under load with detriment to the functions served.

On certain occasions stainless steel articles in the prior art have been resorted to for high temperature duty on the basis of their corrosion resistance and their mechanical properties at low temperatures. In this connection, it can be said that articles made of martensitic or ferritic stainless steels, in general have greater physical strength at low temperature than do those of the austenitic grade. It might be expected that these properties would be retained at high temperatures. It nevertheless is a fact that articles made of the austenitic chromium-nickel stainless steels have a more favorable lattice structure for cohesion under high mechanical stress at temperatures above about 100° F. than do the martensitic or ferritic stainless steels. Still, it is well recognized that certain austenitic steels are unsatisfactory for meeting exacting requirements of articles in high temperature use, particularly where these articles are to be relied upon for resisting mechanical stress. The austenitic stainless steels tend to creep and rupture under load while hot. Apart from these difficulties, however, high temperature articles of the steels offer a wide variety of beneficial properties, among these being corrosion resistance and a favorable lattice structure for strength at high temperatures.

An outstanding object of my invention accordingly is the provision of high temperature austenitic stainless steel articles, which are strong and capable of resisting the damaging effects of corrosion and heat and of withstanding creep and rupture while subjected to mechanical stress at elevated temperatures.

Referring now more particularly to the practice of my invention, I provide high temperature chromium-nickel stainless steel articles in which the steel importantly contains critical amounts of phosphorus and is substantially wholly austenitic, giving the surprising properties of resistance to creep and stress rupture. In addition to the chromium, nickel and phosphorus constituents, sometimes the steel contains supplemental amounts of one or more such elements as manganese, cobalt, copper, molybdenum, tungsten, vanadium, columbium, titanium, aluminum, and the like, the remainder being substantially all iron. Ferrite, if present at all in the steel, is only in traces preferably not exceeding about 1.5% to 2% by volume. This virtual exclusion of ferrite, and the inclusion of critical amounts of the element phosphorus in the austenitic steel, I find enables the use of my articles at temperatures even so high as 1200° F. to 1700° F. or more, and for resisting creep and stress rupture.

The austenitic chromium-nickel stainless steel high temperature articles which I provide, preferably contains in the steel composition, about 0.01% to 0.25% carbon, about 16% to 26% chromium, from 6% to 30% nickel, phosphorus ranging from 0.08% to 0.12%, and the remainder substantially all iron. While the more limited phosphorus range just noted is preferred, the useful range at times extends from about 0.05% to 0.12% and even up to approximately 0.5%. On the low side of the more general range, however, the phosphorus content is nearly too low to lend appreciable improvement to the high temperature mechanical properties of the articles. When the phosphorus amounts to much beyond 0.12%, brittleness of the metal tends to become observable, but no complete loss of the beneficial effects of phosphorus on the high temperature stress resisting properties, is suffered.

Any additional elements which do not materially inhibit the austenitic structure or alter the beneficial effects of phosphorus on the high temperature properties also many be present in the steel, if desired, as for serving special purposes. Such elements as manganese and silicon, while usually preferred in the steel articles in small or incidental quantities, sometimes are included in amounts up to 2% or appreciably more, as where the particular purpose of the articles so demands. There are occasions where I partially replace or merely supplement the amounts of chromium with an element such as molybdenum in the steel, and so produce the articles. The same holds true for nickel in the steel, as where for example manganese or cobalt either or both afford a partial replacement or merely supplement given amounts of the element. At times, the carbon of the steel articles may extend beyond 0.25%, but this usually is not preferred since higher carbon values often tend to inhibit working and fabricating the metal.

Examples of certain more specific and preferred compositions of the high temperature articles which I provide are noted below in Table I. It will be appreciated, with particular attention to the high-phosphorus steels employed, that the articles are produced without appreciable extra cost of materials as compared with the cost of standard low-phosphorus grades of stainless steel.

TABLE I. HIGH TEMPERATURE STAINLESS STEEL ARTICLE COMPOSITIONS

| Article | Percent C | CR | NI | P | Other Elements |
|---|---|---|---|---|---|
| A | 0.08–0.20 | 16–18 | 6–8 | 0.05–0.5 | |
| B | 0.08–0.20 | 17–19 | 8–10 | 0.05–0.5 | |
| C | 0.08–0.20 | 17–19 | 8–10 | 0.05–0.5 | S or Se, 0.07% Min.; Mo or Zr, 0.6% Max. |
| D | 0.08 Max. | 18–20 | 8–10 | 0.05–0.5 | |
| E | 0.08 Max. | 19–21 | 10–12 | 0.05–0.5 | |
| F | 0.20 Max. | 22–24 | 12–15 | 0.05–0.5 | |
| G | 0.25 Max. | 24–26 | 14–22 | 0.05–0.5 | Si 1.50 Max. |
| H | 0.10 Max. | 16–18 | 10–14 | 0.05–0.5 | Mo 1.75–2.50 |
| I | 0.10 Max. | 17–19 | 8–11 | 0.05–0.5 | Min. Ti=10×C |
| J | 0.10 Max. | 17–19 | 9–12 | 0.05–0.5 | Min. Cb=8×C |

NOTE.—Articles A–J, inclusive, contain Mn 2% max., Si 1% max., S 0.04% max., and remainder substantially all iron, unless other amounts of these elements appear in the table.

The phosphorus-containing stainless steel has, by virtue of the particular combination of elements therein, the remarkable ability to be worked and fabricated. This is particularly true where the phosphorus content ranges from 0.08% to 0.12%. Among the wrought articles which I provide, illustratively, are shafts, bolts and fastenings for high temperature chemical apparatus, tubing for high pressure heat exchangers, boiler struts and rods, furnace parts, roller chains to handle furnace loads, and conveyer belting for the heat treatment of products where heavy loads and great heat must be withstood. Further examples of the austenitic phosphorus-containing stainless steel articles which I provide are thermocouple parts and temperature control instruments. Still further examples are exhaust supports, manifolds, screws, bands, and the like, valve fittings to handle hot corrosive media, chimney and flue structural elements, wire cloth for chemical screening purposes at high temperatures, wire baskets and racks for metallurgical processing, and numerous other articles needed for withstanding corrosion and stress while heated.

Sometimes I accept the beneficial and satisfactory effects of phosphorus in my high temperature stainless steel articles without any thought of further developing these effects. As an alternative, however, I frequently find advantage in subjecting the phosphorus-containing steel to special heat treatment including a combination of annealing and aging treatments for further enhancing the resistance to creep and stress rupture over and above the results gained by the presence of phosphorus in the relatively untreated steel. In the annealing portion of this treatment, I heat the steel, as for example the article itself, to a sufficiently high temperature and for long enough time for forming a solid solution including phosphorus and other components of the steel. A preferred temperature range for this purpose is that of about 2000° F. to 2250° F. at these temperatures, a holding time of about one-half hour is usually adequate for solubility.

Following the heating for solubility, I quench the steel, conveniently to about room temperature, this for example while using air, oil or water as the quenching medium.

After the annealing and quenching steps of my special heat treatment, I re-heat the stainless steel, this time to an optimum temperature of about 1300° F., or advantageously within an approximate temperature range of 1200° F. to 1500° F., for precipitation treatment. Upon holding the metal at temperature for a sufficient period of time, preferably for a period of at least about five hours, precipitates accrue in the matrix. These precipitates are finely divided and are critically dispersed in the metal lattice along the atomic slip planes. They are thought to include intermediate compounds. It is believed that the phosphorus in solution inhibits the diffusion of carbides. There is some evidence too that the phosphorus comes out of solution with chromium and as a chromium compound.

At the conclusion of the precipitation treatment, I quench the steel. The quenched metal has enhanced load carrying capacity and improved creep resistance in view of atomic slip interference exerted by the precipitates. These precipitates remain uncoalesced between the atomic slip planes and effective against creep and stress rupture of the steel for extremely long periods of time at high temperatures.

As illustrative of the practice of my invention, I provide high-phosphorus austenitic stainless steel containing about 0.098% carbon, 16.90% chromium, 13.80% nickel, 0.098% phosphorus, 2.99% molybdenum, 1.20% manganese, 0.51% silicon, 0.015% sulphur, and the remainder substantially all iron. This steel for example is in the form of an ingot which I work into small billets by forging at a suitable temperature. Then, by such operation as hot-rolling, I produce boiler rods of the steel, these illustratively being in rough form. Should the rods require flanges near the ends, I sometimes apply these using the same type of steel and by welding with an oxyacetylene torch or by electric arc means, the welding rods for this purpose preferably being of the same analysis as the parent metal. The roughly formed articles conveniently are heated to annealing temperature and quenched. In the present instance, this is achieved by heating the steel to 2250° F., holding the metal at this temperature for about one-half hour, and thereafter quenching in water. For subjecting the metal to precipitation treatment, I heat the annealed boiler rods to a temperature of about 1200° F., and maintain this temperature for approximately five hours. At the end of this treatment, I quench the rods in water. Machining of the rods to finished dimensions and threading the ends are undertaken where desired, either before or after the precipitation treatment. Upon being finished and put into use, the rods are resistant to heat and corrosion. They are capable of enduring at 1200° F., a load of 33,000 p. s. i. for 105 hours, a load of 30,800 p. s. i. for 446 hours, and a load of 30,000 p. s. i. for 1981 hours. These values extrapolated logarithmically reveal that, at the same temperature, the rods can endure a load of 28,000 p. s. i. for 10,000 hours and a load of 27,000 p. s. i. for 100,000 hours. The rods have favorable creep and stress rupture properties at considerably higher temperatures than 1200° F.

Thus it will be seen that in this invention high-phosphorus austenitic stainless articles are provided in which the various objects noted, together with many thoroughly practical advantages are successfully achieved. It will be seen that the steel products are strong and durable, corrosion resistant and heat resistant and are well adapted to withstand high temperatures over long periods of service and under varied conditions of actual practical use.

It will be appreciated that under certain conditions of high temperature use of the articles, reliance may be had upon the prevailing high temperatures to achieve precipitation for enhancing the load-carrying capacity and resistance to creep.

As many possible embodiments may be made of my invention and as many changes may be made in the embodiment hereinbefore set forth, it is to be understood that all matter described herein is to be interpreted as illustrative and not as a limitation.

I claim:

1. Heat-hardened stainless steel [characterized by resistance to creep and stress rupture, the steel being] of austenitic chromium-nickel grade free of amounts of ferrite beyond about 2% by volume, and containing, in addition to about 16% to 26% chromium and 6% to 30% nickel, about 0.05% to 0.5% phosphorus, and the remainder substantially all iron, and said steel having a finely divided precipitate in the matrix for slip interference at high temperatures produced by annealing at [2000° F. to 2250° F.] *a sufficiently high temperature and for long enough time to form a solid solution of phosphorus* and quenching followed by precipitation-hardening from 1200° F. to 1500° F.

2. Heat-hardened chomium-nickel stainless steel high temperature articles characterized by resistance to creep and stress rupture, the steel of said articles being substantially wholly austenitic, containing in approximate percentages, 0.01% to 0.25% carbon, 16% to 26% chromium, from 6% to 30% nickel, phosphorus ranging from 0.05% to 0.5%, and the remainder substantially all iron, and said steel having a finely divided precipitate in the matrix for slip interference at high temperatures produced by annealing at *about* 2000° F. to 2250° F. and quenching followed by precipitation-hardening treatment at 1200° F. to 1500° F.

3. Age-hardened austenitic chromium-nickel stainless steel articles characterized by freedom from ferrite beyond about 2% by volume and by resistance to creep and stress rupture at high temperatures and containing about 0.10% maximum carbon, 16% to 18% chromium, 10% to 14% nickel, 1.75% to 2.5% molybdenum, 0.05% to 0.5% phosphorus, and the remainder substantially all iron, said steel having a finely divided precipitate in the matrix for slip interference at high temperatures produced by annealing at [1200° F.] *about 2000° F.* to 2250° F. and quenching followed by precipitation-hardening at 1200° F. to 1500° F.

4. Age-hardened austenitic chromium-nickel stainless steel articles characterized by freedom from ferrite beyond about 2% by volume and by resistance to creep and stress rupture at high temperatures and containing about 0.10% maximum carbon, 17% to 19% chromium, 8% to 11% nickel, 0.05% to 0.5% phosphorus, titanium at least ten times the carbon content, and the remainder substantially all iron, said steel having a finely divided precipitate in the matrix for slip interference at high temperatures produced by annealing at [1200° F.] *about 2000° F.* to 2250° F. and quenching followed by precipitation-hardening at 1200° F. to 1500° F.

5. Age-hardened austenitic chromium-nickel stainless steel articles characterized by freedom from ferrite beyond about 2% by volume and by resistance to creep and stress rupture at high temperatures and containing about 0.10% maximum carbon, 17% to 19% chromium, 9% to 12% nickel, 0.05% to 0.5% phosphorus, columbium at least eight times the carbon content, and the remainder substantially all iron, said steel having a finely divided precipitate in the matrix for slip interference at high temperatures produced by annealing at [1200° F.] *about 2000° F.* to 2250° F. and quenching followed by precipitation-hardening at 1200° F. to 1500° F.

WILLIAM CHARLES CLARKE, JR.

References Cited in the file of this patent or the original patent

UNITED STATES PATENTS

| Number | Name | Date |
|---|---|---|
| 1,961,777 | Palmer | Jan. 5, 1934 |

FOREIGN PATENTS

| Number | Country | Date |
|---|---|---|
| 375,793 | Great Britain | June 20, 1932 |
| 461,187 | Great Britain | Feb. 8, 1937 |

OTHER REFERENCES

Steel and its Heat Treatment, vol. 2, 4th edition, page 364. Edited by Bullens. Published in 1939 by John Wiley & Sons, New York.

Engineering Alloys, 2nd edition, page 409. Alloy No. 7733. Edited by Woldman et al. Revised in 1945. Published by the American Society for Metals, Cleveland, Ohio.